United States Patent
Yoon et al.

(10) Patent No.: US 8,261,028 B2
(45) Date of Patent: Sep. 4, 2012

(54) CACHED DIRTY BITS FOR CONTEXT SWITCH CONSISTENCY CHECKS

(75) Inventors: Ki W. Yoon, El Dorado Hills, CA (US); Ricardo Allen, San Jose (CR)

(73) Assignee: Intel Corporation, Santa Clara, CA (US)

( * ) Notice: Subject to any disclaimer, the term of this patent is extended or adjusted under 35 U.S.C. 154(b) by 736 days.

(21) Appl. No.: 11/968,121

(22) Filed: Dec. 31, 2007

(65) Prior Publication Data
US 2009/0172298 A1 Jul. 2, 2009

(51) Int. Cl.
G06F 9/455 (2006.01)
(52) U.S. Cl. .......................... 711/156; 718/1
(58) Field of Classification Search ............... 711/118, 711/144, 145, 156; 718/108, 1
See application file for complete search history.

(56) References Cited

U.S. PATENT DOCUMENTS

| | | | |
|---|---|---|---|
| 6,314,510 B1 * | 11/2001 | Saulsbury et al. | 712/213 |
| 6,408,325 B1 * | 6/2002 | Shaylor | 718/108 |
| 7,421,533 B2 * | 9/2008 | Zimmer et al. | 711/6 |
| 7,523,455 B2 * | 4/2009 | Morris | 718/108 |
| 2004/0123288 A1 * | 6/2004 | Bennett et al. | 718/1 |
| 2006/0005003 A1 * | 1/2006 | Grobman | 713/2 |
| 2006/0015869 A1 * | 1/2006 | Neiger et al. | 718/1 |
| 2007/0192767 A1 * | 8/2007 | Inoue et al. | 718/108 |

* cited by examiner

*Primary Examiner* — Jared Rutz
(74) *Attorney, Agent, or Firm* — Thomas R. Lane

(57) ABSTRACT

Embodiments of an invention using cached dirty bits for context switch consistency checks are disclosed. In one embodiment, a processor includes control logic and a cache. The control logic is to cause a consistency check to be performed on a subset of a plurality of state components during a first context switch. The cache is to store a dirty entry for each state component to indicate whether the corresponding state component is included in the subset.

20 Claims, 2 Drawing Sheets

METHOD 200

CACHED DIRTY BITS FOR CONTEXT SWITCH CONSISTENCY CHECKS

FIELD

Embodiments of the invention relate to microprocessor architecture. More particularly, embodiments of the invention relate to context state switches within a microprocessor.

BACKGROUND

Modern microprocessors may perform numerous functions requiring a change of context state. For example, a microprocessor may change context state information when switching between groups of instructions, such as software threads. In changing between software threads, for example, context state of one group of instructions may be saved to a memory location and the context state of another group of instructions may be restored from memory and loaded into the microprocessor.

The term "context switch" typically refers to a change from one processor execution state to another, such as a software thread switch. A context switch is typically performed either by the operating system or by a user's program. For example, a context switch may occur as a result of calling a subroutine within a user's program, in which the calling program's context is saved in a storage area, such as a stack when the call to the subroutine occurs, and restored from the storage area when returning from the called subroutine. A context switch may also refer to a transition from a host mode to a virtual machine mode (a "VM entry") or vice versa (a "VM exit").

Consistency checks may be performed as part of the execution of instructions that effect context switches. For example, in processor in the Intel® Pentium® Processor Family, consistency checks are performed on certain control register fields such as CR0.CD, CR0.PG, CR4.PGE, etc to make sure they hold valid values for the target context to which to be transitioned. Consistency checks are especially important when the new state is being loaded from unprotected and entrusted memory structures.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

Embodiments of an invention involving using cached dirty bits for context state consistency checking are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

Embodiments of the present invention provide an approach to performing consistency checks during context switches that may be more efficient that other approaches. Therefore, embodiments of the present invention may noticeably improve the performance of information processing systems the support multiple processes, multiple threads, virtual machines, and/or other such features of modern systems.

Embodiments of the present invention may be applied to any type of context switch for any purpose. Embodiments involving VM entries and VM exits are described; however, embodiments of the present invention are not limited to transitions involving VMs or to context state stored in a virtual machine control structure ("VMCS").

Figure 1:
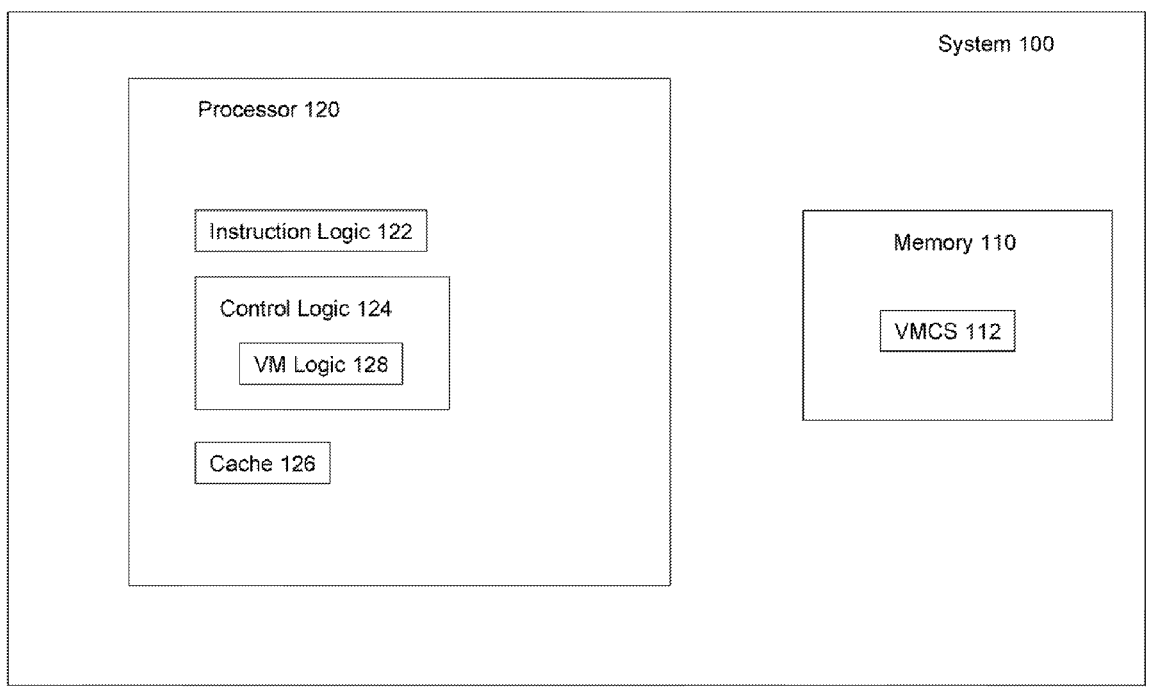
FIG. 1 illustrates a system, memory, and processor using cached dirty bits for context state consistency checking according to an embodiment of the present invention.

FIG. 1 illustrates system 100, including memory 110 and processor 120, according to an embodiment of the present invention. Memory 110 and processor 120 may be coupled to or communicate with each other within system 100 according to any known approach, such as directly or indirectly through one or more buses, point-to-point, or other wired or wireless connections. System 100 may also include any other components not shown in FIG. 1.

Memory 110 may be static or dynamic random access memory, flash memory, magnetic or optical disk memory, any other type of medium readable by processor 120, or any combination of such mediums. Memory 110 includes VMCS 112 to save state of processor 120 to facilitate context switching between a VMM running in root mode (the "host") and a OS or application software running in a virtual machine (a "guest"). VMCS 112 may be formatted to hold host and guest state as discrete elements or groups of elements of state information as "VMCS components" which may be accessed only by VMCS access instructions and not by ordinary writes to memory.

Processor 120 may be any type of processor, including a general purpose microprocessor, such as a processor in the Intel® Pentium® Processor Family, Itanium® Processor Family, or other processor family from Intel® Corporation, or another processor from another company, or a special purpose processor or microcontroller. Processor 120 may include multiple threads and multiple execution cores, in any combination. Processor 120 includes instruction logic 122, control logic 124, and cache 126. Processor 120 may also include any other circuitry, structures, or logic not shown in FIG. 1.

Cache 126 may include static random access memory or any other type of memory or storage location to hold dirty bits according to an embodiment of the present invention, as will be described below. Cache 126 may be dedicated to a usage according to an embodiment of the present invention, or may be part of a cache used for other purposes. In either case, cache 126 includes one storage location, field, or bit (a "dirty bit") for each component of VMCS 112.

Instruction logic 122 is to receive instructions, such as VMCS access instructions, to which processor 120 is designed to respond, as described below. Instruction logic 122 may include any circuitry, logic, or other structure that recognizes, decodes, or otherwise receives instructions.

Control logic 124 is to cause processor to respond to instructions, such as VMCS access instructions, received by instruction logic 122. Control logic 124 may include any circuitry, logic, or other structures, such as microcode, state machine logic, programmable logic, or any other form of control logic, to cause processor 120 to respond appropriately to instructions. To do so, control logic 124 may refer to any form of hardware, software, or firmware, such as a processor abstraction layer, within processor 120 or within any device accessible or medium readable by processor 120, such as memory 110.

Control logic may include virtual machine ("VM") logic 128. VM logic 128 may include any circuitry, logic, or other structures to support virtualization (e.g., the execution of VMs) in processor 120.

Figure 2:
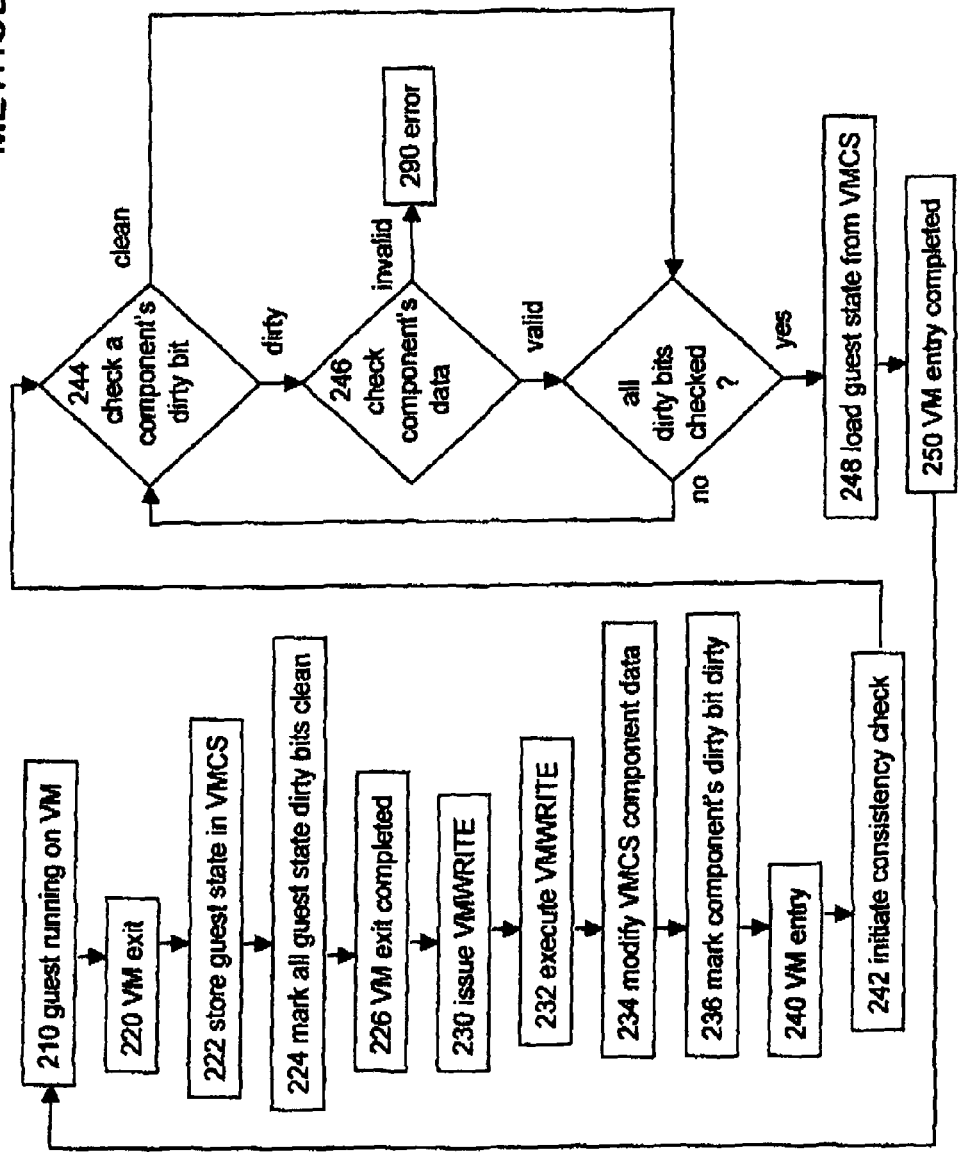
FIG. 2 illustrates a method for using cached dirty bits for context state consistency checking according to an embodiment of the present invention.

Control logic 124 may operate based on signals from instruction logic 122, and/or based on any parameters or other information associated with instructions, to cause processor 120 to execute portions of method embodiments of the present invention, such as method 200, as illustrated in FIG. 2. For example, control logic 124 may cause processor 120 to execute portions of method embodiments of the present invention by executing one or more micro-instructions or micro-operations in response to receiving an instruction.

FIG. 2 illustrates method 200 for using dirty bits for context state consistency checks according to an embodiment of the present invention. Although method embodiments of the invention are not limited in this respect, reference may be made to elements of system 100 to describe the method embodiment of FIG. 2. Method 200 may refer to instructions by names that may be used according to one embodiment; in other embodiments, these instructions or similar instructions may have different names.

In box 210 of method 200, a guest is running in a VM on processor 120.

In box 220, a VM exit is initiated. As part of the VM exit, guest state is stored from processor 120 to VMCS 112 in box 222. Also as part of the VM exit, the dirty bits for all of the guest state VMCS components are marked as clean in cache 126 in box 224. In box 226, the VM exit is completed.

In box 230, an instruction (e.g., a VM WRITE instruction issued by the VMM) to write to a particular component of guest state in VMCS 112 is received by instruction logic 122. In box 232, control logic 124 causes processor 120 to execute the VMWRITE instruction, changing the value stored in VMCS 112 for that component. In box 234, control logic 124, also as part of the execution of the VMWRITE instruction, marks the dirty bit for that component as dirty. In one embodiment, control logic 124 marks the dirty bit dirty based only on the execution of a VMWRITE instruction to the component identified by the instruction, i.e., control logic 124 does not compare the value to be written to the VMCS to the value already stored in the VMCS to determine whether the VMCS is actually being modified.

In box 240, a VM entry is initiated to transfer control back to the guest whose state is stored in VMCS 112. As part of the VM entry, a consistency check of the guest state stored is VMCS 112 is initiated in box 242. As part of the consistency check, the dirty bit for a guest state component in VMCS 112 is checked in box 244. If the dirty bit is dirty, the corresponding data in VMCS 112 is checked for validity in box 246. However, if the dirty bit is clean, the corresponding data is not checked for validity.

If invalid data is found in box 246, an error is reported in box 290. Otherwise, box 244 is repeated for all guest state components. Box 246 is performed only for dirty components. Therefore, consistency checking may be performed in fewer clock cycles than if the data in VCMS 112 for all guest state components were checked for validity.

If the consistency check is completed with no errors, guest state is loaded from VMCS 112 to processor 120 in box 248. In box 250, the VM entry is completed.

Within the scope of the present invention, the method illustrated in FIG. 2 may be performed in a different order, with illustrated boxes omitted, with additional boxes added, or with a combination of reordered, omitted, or additional boxes. For example, for the sake of simplicity. FIG. 200 does not show a consistency check or the loading of host state from the VMCS to the processor for the VM exit, or the storing of host state from the processor to the VMCS for the VM entry.

Processor 120, or any other component or portion of a component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, embodiments of an invention involving using cached dirty bits for context switch consistency checks have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
   control logic to cause a consistency check to be performed on a subset of a plurality of state components during a first context switch, the first context switch including transferring each of the plurality of state elements between the processor and a virtual machine control structure; and
   a cache to store a dirty entry for each state component to indicate whether the corresponding state component is included in the subset.

2. The processor of claim 1, further comprising instruction logic to receive an instruction to modify a stored value of one of the plurality of state components, wherein the control logic is to mark the corresponding dirty entry to include the one of the plurality of state components in the subset in response to the instruction logic receiving the instruction.

3. The processor of claim 1, wherein the control logic is also to check the dirty entry for each state component and to cause the consistency check to be skipped for those state components whose dirty entry indicates that the corresponding component is not in the subset.

4. The processor of claim 1, wherein the first context switch includes restoring stored values for the state components to the processor state.

5. The processor of claim 1, wherein the dirty entry is a dirty bit to be marked dirty to be included in the subset.

6. The processor of claim 1, wherein the dirty entry is a dirty bit to be marked clean during a second context switch to save the processor state.

7. The processor of claim 1, further comprising virtual machine control logic to support virtualization, where the first context switch includes a virtual machine entry and the state components are to describe a guest state.

8. The processor of claim 1, further comprising virtual machine control logic to support virtualization, where the first context switch includes a virtual machine exit and the state components are to describe a host state.

9. The processor of claim 6, further comprising virtual machine control logic to support virtualization, where the second context switch includes a virtual machine entry and the state components are to describe a host state.

10. The processor of claim 6, further comprising virtual machine control logic to support virtualization, where the second context switch includes a virtual machine exit and the state components are to describe a guest state.

11. A method comprising:
    initiating a consistency check during a first context switch, the first context switch including transferring each of a plurality of state elements between a processor and a virtual machine control structure;
    checking a cached dirty entry for each component of a processor state to be restored;
    checking the validity of stored data for each component whose dirty entry is dirty; and
    skipping the consistency check for each component whose dirty entry is clean.

12. The method of claim 11, further comprising:
    receiving an instruction to modify the stored data for one of the components; and
    marking the dirty entry for the one of the components dirty.

13. The method of claim 12, further comprising marking the dirty entry for all of the components clean during a second context switch to save processor state.

14. The method of claim 12, wherein the first context switch is a virtual machine entry and the processor state to be restored is a guest state.

15. The method of claim 12, wherein the first context switch is a virtual machine exit and the processor state to be restored is a host state.

16. The method of claim 13, wherein the second context switch is a virtual machine entry and the processor state to be saved is a host state.

17. The method of claim 13, wherein the second context switch is a virtual machine exit and the processor state to be saved is a guest state.

18. A system comprising:
    a memory to store state; and
    a processor including:
        control logic to cause a consistency check to be performed on a subset of a plurality of state components during a context switch to restore processor state from the memory, the context switch including transferring each of the plurality of state components between the processor and a virtual machine control structure in the memory; and
    a cache to store a dirty entry for each state component to indicate whether the corresponding state component is included in the subset.

19. The system of claim 18 wherein the memory is to store state in the virtual machine control structure.

20. The system of claim 19 wherein the state stored in the memory is accessible to software only through virtual machine control structure access instructions.

\* \* \* \* \*